United States Patent [19]
Epstein

[11] 3,992,617
[45] Nov. 16, 1976

[54] CHOPPING CORRELATOR FOR A MSK DATA SIGNAL

[75] Inventor: Marvin Aaron Epstein, Monsey, N.Y.

[73] Assignee: International Telephone and Telegraph Corporation, Nutley, N.J.

[22] Filed: Oct. 1, 1975

[21] Appl. No.: 618,537

[52] U.S. Cl. .............................. 235/181; 178/66 A; 325/320; 329/104
[51] Int. Cl.² .................... G06G 7/19; H04L 27/14
[58] Field of Search .................. 235/181; 178/66 A; 325/320, 473–477; 329/104

[56] References Cited
UNITED STATES PATENTS
3,743,775  7/1973  Hutchinson et al. ............. 325/320

OTHER PUBLICATIONS

Mengali: Phase Noncoherent Reception of Binary FSK Signals, IEEE Transitions on Communication Technology, Feb. 1971, vol. COM-19, No. 1 pp. 85–88.
B498,775; 3–1976 Balcewicz Minimum Shift Keying Communication System.

Primary Examiner—Felix D. Gruber
Attorney, Agent, or Firm—John T. O'Halloran; Alfred C. Hill

[57] ABSTRACT

The MSK signal is distributed to eight choppers, each of which also has coupled thereto a different sum or difference cosine or sum or difference sine chopping signal. The output signals from the choppers are summed in selected pairs in summers whose output signals are integrated over a predetermined number of unit time intervals. Coupled between four of the summers and four of the associated integrators there is an integrated time selector which enables adjusting the integrator output for different baud rates of the MSK signal input. The output signals of the integrators are coupled in pairs of multiplexers whose output signals in turn are coupled to sample and hold circuits. The output signals of the sample and hold circuits are coupled to another multiplexer whose output signal is coupled to an analog-to-digital converter to provide the data carried by the MSK signal in digital form. The correlator will provide an output from the analog-to-digital converter at a steady rate of two correlation coefficient values per unit interval for a given baud rate.

13 Claims, 2 Drawing Figures

CHOPPING CORRELATOR FOR A MSK DATA SIGNAL

BACKGROUND OF THE INVENTION

This invention relates to data signal correlation detectors, and more particularly, to a MSK data signal correlation detectors.

The abbreviation MSK employed herein means minimum shift keying. A MSK signal may be defined as a signal where the transmitted wave is a phase continuous frequency shift waveform. For each unit interval the instantaneous frequency is a constant being either a high frequency or a low frequency relative to a center frequency. The high frequency is such as to advance one revolution relative to the carrier frequency in four unit intervals. The low frequency is such as to fall behind by one revolution to the carrier frequency in four unit intervals.

Prior art correlators for a MSK data signal requires generation of correlation waveforms. This is accomplished by generating the four amplitude modulated waveforms $\cos w_o t \cos w_m t$ for $2KT \leq t < (2K+2)T$; $\sin w_o t \cos w_m t$ for $2DT \leq t < (2K+2)T$, $\cos w_o t \sin w_m t$ for $(2K-1)T \leq t < (2K+1)T$, and $\sin w_o t \sin w_m t$ for $(2K-1)T \leq t < (2K+1)T$ over two unit time intervals where the unit time intervals are denoted by T, $w_o$ equals the carrier frequency in radians and $w_m$ equals the modulating frequency in radians. The incoming signal is then correlated against the generated correlation waveforms producing two new correlation coefficients for each unit time interval T.

These devices have the disadvantage that they need analog sum and difference frequency generators, analog gain circuits to produce the $\sin w_m t$ or $\cos w_m t$ amplitude modulation, analog correlators and have difficult problems in maintaining accurate phase relations.

SUMMARY OF THE INVENTION

An object of the present invention is to provide a correlator for a MSK data signal which does not require the above-mentioned correlation waveforms.

Another object of the present invention is to provide a correlator for a MSK data signal which employs square wave version of constant amplitude sine and cosine waveforms rather than the above-mentioned correlation waveforms.

A further object of the present invention is to provide a correlator for a MSK data signal that employs choppers (analog gating circuits) and linear summers in place of the analog multipliers (correlators) of the prior art.

Still a further object of the present invention is to provide a correlator for a MSK data signal wherein the circuits and waveforms are digital in nature instead of analog in nature and, thus, less prone to need adjustments and less sensitive to drift.

A feature of the present invention is the provision of a chopping correlator for a MSK data signal comprising at least: a source of the MSK signal; a first chopper coupled to the source responsive to the MSK signal and a first chopping signal to produce a first output signal; a second chopper coupled to the source responsive to the MSK signal and a second chopping signal different than the first chopping signal to produce a second output signal; a third chopper coupled to the source responsive to the MSK signal and a third chopping signal different than the first and second chopping signal to produce a third output signal; a fourth chopper coupled to the source responsive to the MSK signal and a fourth chopping signal different than the first, second and third chopping signal to produce a fourth output signal; a first summer coupled to the first and second choppers responsive to the first and second output signals to produce a first sum signal; a second summer coupled to the third and fourth choppers responsive to the third and fourth output signals to produce a second sum signal; a third summer coupled to the first and second choppers responsive to the first and second output signals to produce a third sum signal; a fourth summer coupled to the third and fourth choppers responsive to said third and fourth output signals to produce a fourth sum signal; a first integrator coupled to the first summer to integrate the first sum signal over a first predetermined number of given time intervals to produce a first integrated signal; a second integrator coupled to the second summer to integrate the second sum signal over a second predetermined number of given time intervals equal in number to and non-time coincident with but overlapping the first predetermined number of given time intervals to produce a second integrated signal; a third integrator coupled to the third summer to integrate the third sum signal over a third predetermined number of given time intervals equal in number to and time coincident with the second predetermined number of given time intervals to produce a third integrated signal; a fourth integrator coupled to the fourth summer to integrate the fourth sum signal over a fourth predetermined number of given time intervals equal in number to and time coincident with the first predetermined number of given time intervals to produce a fourth integrated signal; and means coupled to at least the first, second, third and fourth integrators to produce as an output signal of the correlator a digital representation of the data generated by said first, second, third and fourth integrated signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
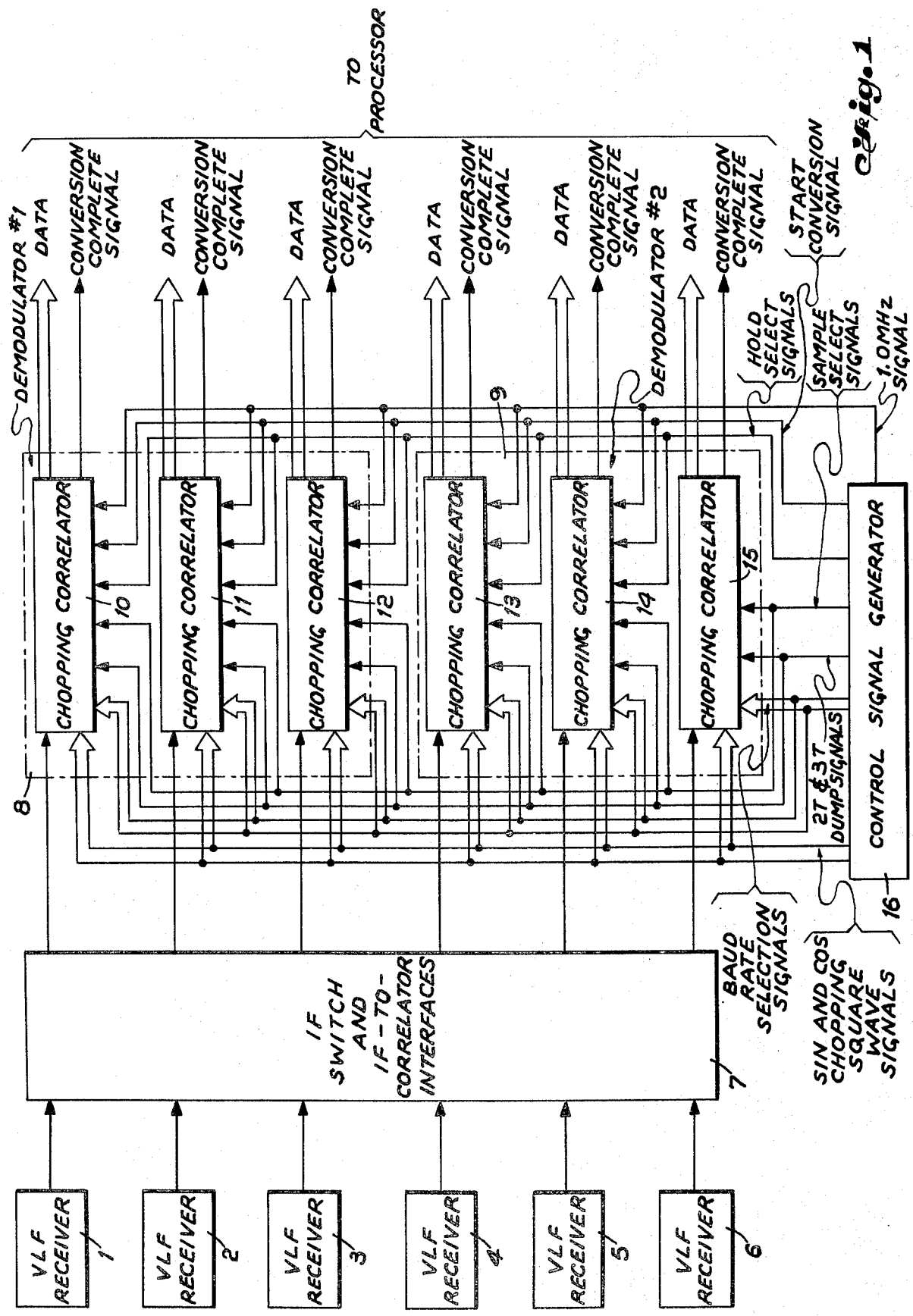
FIG. 1 is a block diagram of a receiver employed in receiving a number of different MSK data signals incorporating the chopping correlator in accordance with the principles of the present invention.

Referring to FIG. 1, six different MSK signals are capable of being received by receivers 1–6, which are VLF (very low frequency) receivers. The IF (intermediate frequency) output signals of receivers 5–6 are coupled to IF switch and IF-to-correlator interfaces 7 for distribution of the IF signals of receivers 1–6 to the two demodulators 8 and 9, each of which includes three chopping correlators 10–12 and 13–15, respectively. The output signal of each of correlators 10–15 is the data carried by the MSK signal received on the receiver 1–6 in digital form and a conversion complete signal which are coupled to a processor, which is not shown.

A control signal generator 16 provides a number of timing control signals for each of the correlators 10–15, a 1.0 MHz (megahertz) clock signal, carrier signal and modulation signal sum and difference sine chopping square wave signals and carrier signal and modulation signal sum and difference consine chopping square wave signals. The chopping square wave signals may be provided by a variable frequency crystal controlled carrier signal and modulating signal sources whose sine wave outputs are added and subtracted in a mixer and then squared. These sum and difference sine square wave signals are used directly and are shifted 90° in phase to provide the cosine chopping square wave signals. The 1.0 MHz clock signal, the start conversion signal, the hold select signals, the sample select signals, the baud rate selection signals and the 2T and 3T dump signals may be generated by a crystal controlled square wave source of sufficient frequency which is divided in binary counters with 1.0 MHz clock and the various timing control signals being removed from these binary counters to provide the desired timing control signals to appropriately control the operation of each of the chopping correlators.

Figure 2:
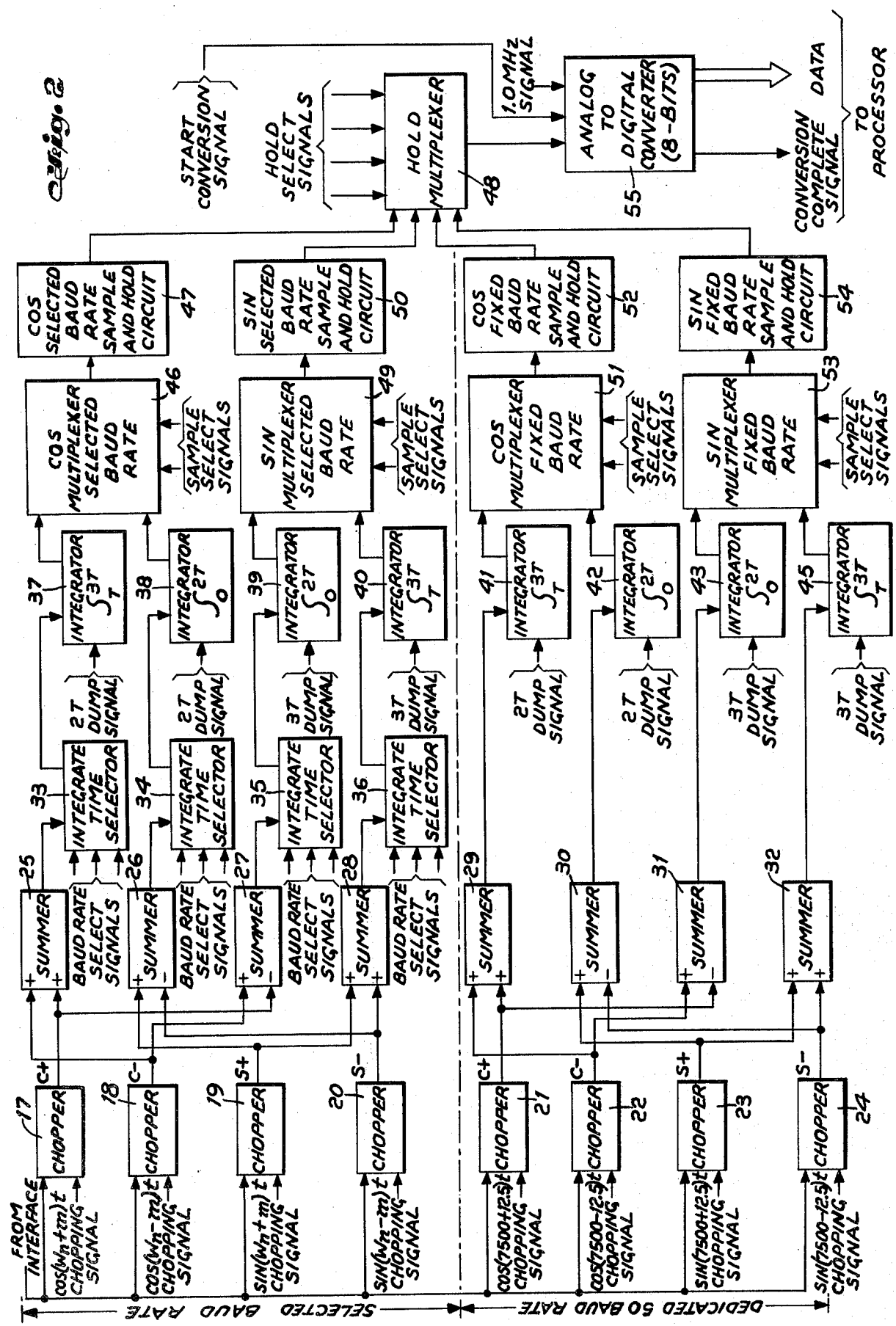
FIG. 2 is a block diagram of one of the chopping correlators of FIG. 1 in accordance with the principles of the present invention.

Referring to FIG. 2 there is illustrated a block diagram of one of the chopping correlators of FIG. 1. The MSK signal is distributed to eight choppers 17–24. In the following description only the upper four choppers 17–20 which are used to select the reception of MSK signal having a desired or selected baud rate from among MSK signals that have different baud rates. The operation of the bottom four choppers 21–24 which are dedicated to a given baud rate, illustrated as being a 50 baud rate, operates the same as the upper four choppers, except that the baud rate is fixed and different.

The choppers 17–20 accept as an input an analog IF waveform from one of the interfaces of interfaces 7 (FIG. 1) and a digital square wave chopping signal to produce a chopped output waveform signal. When the input chopping signal is high or a logical 1, the chopped output signal equals the input analog signal and when the input chopping signal is low or logical 0, the output signal equals the negative of the input analog signal.

Consider for the instant chopper 17. The input MSK signal is $r(t)$. The chopping signal is the square wave version of $\cos(w_n + m)t$, where $w_n$ is equal to a carrier frequency in radians, $m$ is equal to a modulating frequency in radians and $t$ is equal to time. Thus, the output signal of chopper 17 equals $r(t) \cdot \text{sign}(\cos(w_n + m)t)$. Now the sign $\cos wt$ for any $w$ can be expanded in a Fourier power series $4/\pi (\cos wt - (\cos 3wt)/3 + (\cos 5wt)/5 ...)$.
In the integration at the end of the processing if $w_n$ is much larger than m all but the first term of the immediately above equation can be neglected. Similarly for the sin $(w_n + m) t$, the chopping waveform applied to chopper 19, the output signal equals $r(t) \cdot \text{sign}(\sin(w_n + m)t)$. Then as above the sign $(\sin wt)$ for any $w$ can be expanded in the Fourier series $4/\pi (\sin wt + (\sin wt)/3 + (\sin 5wt)/5 ...)$
and all terms can be neglected except for the first term. Using this analysis it is seen that the outputs of choppers 17–20 are $C+ = r(t)(4/\pi)\cos(w_n+m)t$, $C- = r(t)(4/\pi)\cos(w_n-m)t$, $S+ = r(t)(4/\pi)\sin(w_n+m)t$, and $S- = r(t)(4/\pi)\sin(w_n-m)t$.

The same analysis can be employed for choppers 21–25, which have fixed chopping signals but which will produce similar outputs, where 7500 is substituted for $w_n$ and the 12.5 is substituted for $m$.

The output signals of choppers 17–20 are coupled in pairs as illustrated to summers 25–28 and the output signals of choppers 21–24 are coupled in pairs as illustrated to summers 29–32. The + indicates addition and the − indicates subtraction. The output of summers 25–28 are coupled to integrate time selectors 33–36 prior to coupling to integrators 37–40. It will be noted that the selectors 33–36 respond to the baud rate select signals to select an appropriate capacitor to change the slope of the output of integrators 37–40 for a unit input voltage. Thus, a given correlation coefficient will have the same output value at the end of a time interval corresponding to the data bits for different baud rates. In other words, it is the selectors 33–36 together with the associated chopping waveforms that enable the adjusting of the baud rate of the correlator to be compatible with the baud rate of the input MSK signal.

It should be noted that integrators 38 and 39 integrate the output of the summers 26 and 27 for 2T unit time intervals extending from the 0 to 2T, while integrators 37 and 40 integrate the output signal of summers 25 and 28 also for a 2T unit time interval but extending from T to 3T. Appropriate dump signals are coupled to integrators 37–40 to empty the integrators after integrating over the unit time intervals involved to permit the integrators to properly operate over the succeeding unit time intervals.

Integrators 41–44 are coupled respectively to the outputs of summers 29–32 and integrate over a predetermined number of time intervals T as described above with respect to integrators 37–40. No integrate time selector is required at the output of summers 29–32 since the chopping signal is fixed value and not variable as is the case with the chopping signals to choppers 17–20.

The output of integrator 39 provides the integral $$4/\pi \int_{(2KT)}^{(2K+2)T} r(t)(\cos(w_n-m)t - \cos(w_n+m)t)dt.$$

Using standard trignometric identities it can be seen than $\cos(w_n - m)t - \cos(w_n + )t = 2 \sin w_n t \sin mt$. Thus, the output of integrator 37 is $$(8/\pi) \int_{2KT}^{(2K+2)T} r(t) \sin w_n t \sin mt \, dt$$

which is one of the desired integrals. The other integrators 37, 38 and 40 produce integraos of $r(t)$ with $\cos w_n t \sin mt$, $+\sin w_n t \cos mt$ and $+\cos mt$, respectively.

Similar integrals are provided at the output of integrators 41–45 with the substitution of the numerical values for the letter symbols as indicated hereinabove.

The output signals of integrators 37 and 38 are coupled to multiplexer 46 and hence to sample and hold circuit 47 prior to coupling to hold multiplexer 48. The output signals of integrators 39 and 40 are coupled to multiplexer 49 and then to sample and hold circuit 50 prior to being coupled to multiplexer 48. The output signals of integrators 41 and 42 are coupled to multiplexer 51 and then to sample and hold circuit 52 prior to being coupled to multiplexer 48. The output signals of integrators 43 and 45 are coupled to multiplexer 53 and then to sample and hold circuit 54 prior to being coupled to multiplexer 48. The sampling of the contents of multiplexers 46, 49, 51 and 53 are controlled by sample select signals prior to application to sample and hold circuits 47, 50, 52 and 54. The contents of multiplexer 48 are coupled to analog-to-digital converter 55 under control of the hold select signals.

The operation of the correlator of this invention is as follows. For a dedicated baud rate or a selected baud rate of the MSK signal, when the chopping signal of one of the choppers 17–24 is optimumally correlated at sampling time with the MSK signal that one chopper output signal will have a relatively large amplitude representing the data with no crosstalk from adjacent data signals and the output signal of the other chopper pertinent to the sampling time will have a relatively low amplitude representing crosstalk only or noise. This results in a relatively large amplitude output signal from the associated one of the summers 25–32 and negligible amplitude output signal from the other of the summers. This in turn results in a relatively large amplitude output signal from the associated one of the integrators 37–45 for the integration time interval involved and a negligible amplitude output signal from the other integrators for the integration time interval involved. The output signals from those integrators available at the end of a unit interval are coupled through the associated multiplexers 46, 49, 51 and 53 under control of the sample select signals, through the associated ones of the sample and hold circuits 47, 50, 52 and 54 and through multiplexer 48 under control of the hold select signals to converter 55 to provide two correlation coefficients per unit interval per baud rate in digital form.

The correlator of this invention provides a means of correlating an incoming MSK signal against a sine wave analog amplitude modulated carrier in two phases 90° apart. This is very useful for MSK or multiple frequency reception.

While I have described above the priniciples of my invention in connection with specific apparatus it is to be clearly understood that this description is made only by way of example and not as a limitation to the scope of my invention as set forth in the objects thereof and in the accompanying claims.

I claim:

1. A chopping correlator for a minimum shift keying (MSK) data signal comprising at least:
    a source of said MSK signal;
    a first chopper coupled to said source responsive to said MSK signal and a first chopping signal to produce a first output signal;
    a second chopper coupled to said source responsive to said MSK signal and a second chopping signal different than said first chopping signal to produce a second output signal;
    a third chopper coupled to said source responsive to said MSK signal and a third chopping signal different than said first and second chopping signal to produce a third output signal;
    a fourth chopper coupled to said source responsive to said MSK signal and a forth chopping signal different than said first, second and third chopping signal to produce a fourth output signal;
    a first summer coupled to said first and second choppers responsive to said first and second output signals to produce a first sum signal;
    a second summer coupled to said third and fourth choppers responsive to said third and fourth output signals to produce a second sum signal;
    a third summer coupled to said first and second choppers responsive to said first and second output signals to produce a third sum signal;
    a fourth summer coupled to said third and fourth choppers responsive to said third and fourth output signals to produce a fourth sum signal;
    a first integrator coupled to said first summer to integrate said first sum signal over a first predetermined number of given time intervals to produce a first integrated signal;
    a second integrator coupled to said second summer to integrate said second sum signal over a second predetermined number of given time intervals equal in number to non-time coincident with but overlapping said first predetermined number of given time intervals to produce a second integrated signal;
    a third integrator coupled to said third summer to integrate said third sum signal over a third predetermined number of given time intervals equal in number to and time coincident with said second predetermined number of given time intervals to produce a third integrated signal;
    a fourth integrator coupled to said fourth summer to integrate said fourth sum signal over a fourth predetermined number of given time intervals equal in number to and time coincident with said first predetermined number of given time intervals to produce a fourth integrated signal; and
    means coupled to at least said first, second, third and fourth integrators to produce as an output signal of said correlator a digital representation of the data generated by said first, second, third and fourth integrated signals.

2. A correlator according to claim 1, wherein
    said first chopping signal is a cosine square wave waveform $\cos(w_n + m)t$, where $w_n$ is equal to a carrier frequency in radians, $m$ is equal to a modulating frequency in radians and $t$ is equal to time;
    said second chopping signal is a cosine square wave waveform $\cos(w_n - m)t$;
    said third chopping signal is a sine square wave waveform $SIN(w_n + m)t$; and
    said fourth chopping signal is a sine square wave waveform $SIN(w_n - m)t$.

3. A correlator according to claim 1, wherein
    said second and third predetermined number of time intervals T are equal to two and extend from 0 to 2T; and
    said first and fourth predetermined number of time intervals T are equal to two and extend from T to 3T.

4. A correlator according to claim 3, further including
    a first integration time selector coupled between said first summer and said first integrator responsive to baud rate select signals to alter the slope of said first integrated signal for different baud rates of said MSK signal;
    a second integration time selector coupled between said second summer and said second integrator responsive to baud rate select signals to alter the slope of said second integrated signal for different baud rates of said MSK signal;
    a third integration time selector coupled between said third summer and said third integrator responsive to baud rate select signals to alter the slope of said third integrated signal for different baud rates of said MSK signal; and a fourth integrator time selector coupled between said fourth summer and said fourth integrator responsive to baud rate select signals to alter the slope of said fourth integrated signal for different baud rates of said MSK signal.

5. A correlator according to claim 1, further including a first integration time selector coupled between said first summer and said first integrator responsive to baud rate select signals to alter the slope of said first integrated signal for different baud rates of said MSK signal;

a second integration time selector coupled between said second summer and said second integrator responsive to baud rate select signals to alter the slope of said second integrated signal for different baud rates of said MSK signal;

a third integration time selector coupled between said third summer and said third integrator responsive to baud rate select signals to alter the slope of said third integrated signal for different baud rates of said MSK signal; and a fourth integrator time selector coupled between said fourth summer and said fourth integrator responsive to baud rate select signals to alter the slope of said fourth integrated signal for different baud rates of said MSK signal.

6. A correlator according to claim 1, wherein said first chopping signal is a cosine square wave waveform $\cos(w_n + m)t$, where $w_n$ is equal to a carrier frequency in radians, $m$ is equal to a modulating frequency in radians and $t$ is equal to time;

said second chopping signal is a cosine square wave waveform $\cos(w_n - m)t$;

said third chopping signal is a sine square wave waveform $SIN(w_n + m)t$; and said fourth chopping signal is a sine square wave waveform $SIN(w_n - m)t$; and said $w_n$ and said m are variable to provide correlation between one of said first, second, third and fourth chopping signal and said MSK signal, said MSK signal being capable of having different baud rates.

7. A correlator according to claim 6, wherein a first integration time selector coupled between said first summer and said first integrator responsive to baud rate select signals to alter the slope of said first integrated signal for different baud rates of said MSK signal;

a second integration time selector coupled between said second summer and said second integrator responsive to baud rate select signals to alter the slope of said second integrated signal for different baud rates of said MSK signal;

a third integration time selector coupled between said third summer and said third integrator responsive to baud rate select signals to alter the slope of said third integrator signal for different baud rates of said MSK signal; and a fourth integrator time selector coupled between said fourth summer and said fourth integrator responsive to baud rate select signals to alter the slope of said fourth integrated signal for different baud rates of said MSK signal.

8. A correlator according to claim 1, wherein said first chopping signal is a cosine square wave waveform $\cos(w_n + m)t$, where $w_n$ is equal to a carrier frequency in radians, $m$ is equal to a modulating frequency in radians and $t$ is equal to time;

said second chopping signal is a cosine square wave waveform $\cos(w_n - m)t$;

said third chopping signal is a sine square wave waveform $SIN(w_n + m)t$; and said fourth chopping signal is a sine square wave waveform $SIN(w_n - m)t$; and said $w_n$ and said m are fixed to provide correlation between one of said first, second, third and fourth chopping signal and said MSK signal having a fixed baud rate.

9. A correltor according to claim 1, wherein said means includes a first multiplexer coupled to said first and second integrator, a second multiplexer coupled to said third and fourth integrator, a first sample and hold circuit coupled to said first multiplexer, a second sample and hold circuit coupled to said second multiplexer, a third multiplexer coupled to said first and second sample and hold circuits, and an analog-to-digital converter coupled so said third multiplexer to produces said output signal of said correlator.

10. A correlator according to claim 1, further including a fifth chopper coupled to said source responsive to said MSK signal and a fifth chopping signal to produce a fifth output signal;

a sixth chopper coupled to said source responsive to said MSK signal and a sixth chopping signal to produce a sixth output signal;

a seventh chopper coupled to said source responsive to said MSK signal and a seventh chopping signal to produce a seventh output signal;

an eighth chopper coupled to said source responsive to said MSK signal and an eighth chopping signal to produce an eighth output signal;

a fifth summer coupled to said fifth and sixth chopper responsive to said fifth and sixth output signals to produce a fifth sum signal;

a sixth summer coupled to said seventh and eighth chopper responsive to said seventh and eighth chopper to produce a sixth sum signal;

a seventh summer coupled to said fifth and sixth chopper responsive to said fifth and sixth output signals to produce a seventh sum signal;

an eighth summer coupled to said seventh and eighth chopper responsive to said seventh and eighth output signals to produce an eighth sum signal;

a first integration time selector coupled to said fifth summer;

a second integration time selector coupled to said sixth summer;

a third integration time selector coupled to said seventh summer;

a fourth integration time selector coupled to said eighth summer;

a fifth integrator coupled to said first selector to integrate said fifth sum signal over said first predetermined number of given time intervals to produce a fifth integrated signal;

a sixth integrator coupled to said second selector to integrate said sixth sum signal over said second predetermined number of given time intervals to produce a sixth integrated signal;

a seventh integrator coupled to said third selector to integrate said seventh sum signal over said third predetermined number of given time intervals to produce a seventh integrated signal;

an eighth integrator coupled to said fourth selector to integrate said eighth sum signal over said fourth predetermined number of given time intervals to produce an eighth integrated signal;

each of said first, second, third and fourth selectors being responsive to baud rate select signals to alter the slope of said fifth, sixth, seventh and eighth integrated signals for different baud rates of said MSK signal; and said means is further coupled to said fifth, sixth, seventh and eighth integrators to produce as an output signal of said correlator a digital representation of the data generated by said first, second, third, fourth, fifth, sixth, seventh and eighth integrated signals.

11. A correlator according to claim 10, wherein each of said first, second, third and fourth chopping signals are fixed, and each of said fifth, sixth, seventh and eighth chopping signals are variable.

12. A correlator according to claim 11, wherein said means includes a first multiplexer coupled to said first and second integrators, a second multiplexer coupled to said third and fourth integrators, a third multiplexer coupled to said fifth and sixth integrators, a fourth multiplexer coupled to said seventh and eighth integrators, a first sample and hold circuit coupled to said first multiplexer, a second sample and hold circuit coupled to said second multiplexer, a third sample and hold circuit coupled to said third multiplexer, a fourth sample and hold circuit coupled to said fourth multiplexer, a fifth multiplexer coupled to said first, second, third and fourth sample and hold circuits, and an analog-to-digital converter coupled to said fifth multiplexer to produce said output signal of said correlator.

13. A correlator according to claim 10, wherein said means includes a first multiplexer coupled to said first and second integrators, a second multiplexer coupled to said third and fourth integrators, a third multiplexer coupled to said fifth and sixth integrators, a fourth multiplexer coupled to said seventh and eighth integrators, a first sampe and hold circuit coupled to said first multiplexer, a second sample and hold circuit coupled to said second multiplexer, a third sample and hold circuit coupled to said third multiplexer, a fourth sample and hold circuit coupled to said fourth multiplexer, a fifth multiplexer coupled to said first, second, third and fourth sample and hold circuits, and an analog-to-digital converter coupled to said fifth multiplexer to produce said output signal of said correlator.

* * * * *